PROCESS FOR MAKING SEMICONDUCTOR COMPONENTS
Filed Dec. 10, 1968
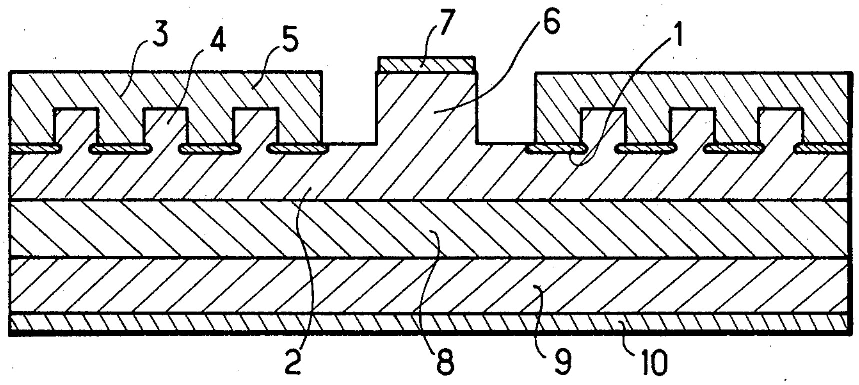
INVENTOR
ANDRÉ RENELLE
BY Sughrue, Rothwell, Mion, Zinn & Macpeak
ATTORNEYS

3,565,705
PROCESS FOR MAKING SEMICONDUCTOR COMPONENTS

André Renelle, 8 Rue des Brugnauts,
92 Bagneux, France

Filed Dec. 10, 1968, Ser. No. 782,703
Claims priority, application France, Dec. 18, 1967, 132,745
Int. Cl. H01l 7/46
U.S. Cl. 148—179 9 Claims

ABSTRACT OF THE DISCLOSURE

A process for making semiconductor components formed of a number of adjacent semiconducting layers having opposite types of conduction and wherein at least one conducting surface constitutes an ohmic shunt between certain parts of each adjacent semiconducting layer.

The present invention pertains to semiconductor components which are formed of a number of semiconducting layers. At least one of the conductive layers constitutes an ohmic shunt between certain parts of one of the outermost layers (which layer will hereinafter be referred to as the "first layer") and certain parts of an adjacent layer which possesses the opposite type of conduction (which layer will hereinafter be called the "second layer").

A process known in the art for producing a component of this type starts with a second layer having an impurity concentration which is located only near its surface but not deeply into the second layer. There are cavities formed in the second layer, the depth of which are smaller than the thickness of the layer. Between the cavities are left projections. A material containing impurities of the opposite type to those of the second layer is applied to at least the greater part of the surface of the second layer. This material diffuses, resulting in the inversion to a certain depth of the type of conduction of those portions of the second layer that are at the base of the cavities. By this process, the elements of the first layer are formed; however, the projecting portions of the second layer remain unchanged. A flexible conductive material is then applied to the whole surface of the semiconductor component which includes both the cavities constituting the first layer and to the projecting portions of the second layer. By this process an ohmic shunt is formed between the first and second layers.

The process according to the present invention simplifies the prior art process set forth above by omitting one of the stages present in the prior art process. This is accomplished by using material which contains impurities of a type opposite those of the second layer, and which material is applied to the second layer after cavities and projections have been formed therein. The material is a doping metal which, when heated to a temperature below diffusion temperature, forms an alloy with the second layer, but which, when heated to a temperature above the diffusion temperature, diffuses instead into the second layer.

As a result of this process, a portion of the doping metal which alloys with the second layer at the base of the cavities in the second layer constitutes, as before, the elements of the first layer. The other portion of the metal which alloys with the second layer on the projecting portions of the second layer forms with the second layer an ohmic contact, in accordance with the process well known in the art.

The process according to the invention thus makes it possible to produce in a single operation both the elements of the first layer and the ohmic connection between the first layer and the second layer, whereas two successive separate operations are necessary in the previously known processes.

This obviously results in the simplification in the manufacture of the component and consequently in a reduction in the cost of the component. The invention also affords great flexibility in the determination of the characteristics of the semiconductor component obtained, because it is possible to vary at will the following parameters: the depth of the cavities in the second layer, the thickness of the layer of doping metal applied to the second layer, and the temperature and duration for the thermal treatment applied to the component to effect the alloying of the metal layer with the second layer.

The invention is of course applicable to semiconductor components comprising any number of layers because it does not in any way affect any layers other than the first and second.

The process according to the invention may also be employed for the production of symmetrical semiconductor components. For this purpose, it is sufficient to apply the material to the two faces of the initial semiconductor component.

It will be obvious that the number, the surface, and the respective arrangement of the cavities and projecting portions of the second layer may be varied absolutely as desired, and that the cavities may be formed by any known method. For example, the projecting portions may take the form of pellets closely disposed on circles concentric with the axis of the component, in accordance with a known arrangement.

In other known arrangements, one projecting portion of the second layer may be left free from covering, in order that a contact-making electrode may be applied thereto. This electrode preferably consists of a metallic body comprising a doping agent having the same type of conduction as the second layer. In accordance with the invention, this electrode may be placed in position during the course of the operation wherein the doping metal forming the shunt is applied.

In the course of this same operation, a counter electrode may be applied to the outer layer of the semiconductor component which is situated on the face of the component opposite to the first and second layers. The invention is advantageously, but not exclusively, applicable to the production of semiconductor components having a controlled electrode, such as for example thyristors. It is unnecessary to illustrate the various stages of the process preceding the application of the doping metal to the second layer, because these stages do not comprise any novel features.

The accompanying figure illustrates by way of non-limiting example, one form of construction of a four layer semiconductor component according to the invention, as seen in section along a plane extending along the axis of the component.

In the figure, the second layer 2 is of for example, p-type and which have been formed by a conventional method having cavities 3 and projecting portions 4 situated between the cavities 3.

The doping metal, which may consist of a sheet of gold-antimony alloy, silver-arsenic alloy, gold-gallium alloy, gold-boron alloy, or aluminum, for example, may then be applied to the whole layer 2. This doping metal therefore comprises portions 1 which are alloyed with layer 2 at the base of the cavities in layer 2, and thereby form, as has been explained previously, the elements of the first layer of n-type. The other portion 5 of the doping metal constitutes an ohmic shunt between the portions 1 which form the first layer in the cavities 3 and the projecting portions 4 of the layer 1.

One of the projecting portions 6 of the layer 2 may be left free from doping metal in order that an electrode 7 can be applied thereto.

The semiconductor component illustrated by way of example also comprises a third layer 8 of n-type, a fourth layer 9 of p-type and a lower electrode 10, which layers do not in any way form a part of the present invention.

Due to the fact that layer 2 is doped more on the surface than it is in depth, the introduction of impurities contained in the doping metal only inverts the type of conduction of the layer 2 at the base of the cavities in the layer 2, and not in the projecting portions of layer 2.

Also, because layer 2 has an impurity concentration which is located only near the surface thereof, the contact between the doping metal and the projecting portions of layer 2 is a substantially ohmic and nonrectifying contact.

What I claim is:

1. A process for the production of a semiconductor device having an ohmic shunt comprising the steps of:

(a) providing a layer of semiconducting material having an impurity concentration located only near the surface, thereof, said surface having cavities and projections formed by said cavities, (b) choosing a doping material having impurities of opposite type of conduction to that of said layer, and (c) applying said doping material to said layer under temperature conditions to cause alloying of said doping material with said layer at the base of said cavities and with said projecting portions of said layer.

2. The process according to claim 1 wherein said layer is of p-type, and said doping material consists of an alloy of gold-antimony.

3. The process according to claim 1, wherein said layer is of p-type and said doping material consists of an alloy of silver and arsenic.

4. The process according to claim 1, wherein said layer is of n-type and said doping material is an alloy of gold and gallium.

5. The process according to claim 1, wherein said layer is of n-type, and said doping material is an alloy of gold and boron.

6. The process according to claim 1, wherein said layer is of n-type and said doping material is aluminum.

7. The process according to claim 1, wherein one of said projections on said layer is free of said doping material.

8. The process according to claim 7, comprising the further step of applying a contact-electrode to said projection free of said doping material, and wherein said contact-electrode consists of a metal doping agent of the same type of conduction as said layer.

9. The process according to claim 1, comprising the further step of applying a counter-electrode to said layer simultaneously with the application of said doping material to said layer.

References Cited

UNITED STATES PATENTS

| | | | |
|---|---|---|---|
| 3,384,518 | 5/1968 | Shoda et al. | 148—179 |
| 3,272,669 | 9/1966 | Im | 148—179 |

RICHARD O. DEAN, Primary Examiner

U.S. Cl. X.R.

148—185